(12) United States Patent
Oh

(10) Patent No.: US 10,876,854 B2
(45) Date of Patent: Dec. 29, 2020

(54) SYSTEM AND METHOD FOR PROVIDING NAVIGATION SERVICE OF DISABLED PERSON BASED ON IMAGE ANALYSIS

(71) Applicant: Amuse Co., Ltd, Seoul (KR)

(72) Inventor: Seo Yeon Oh, Seoul (KR)

(73) Assignee: AMUSE CO., LTD, Seoul (KR)

( * ) Notice: Subject to any disclaimer, the term of this patent is extended or adjusted under 35 U.S.C. 154(b) by 0 days.

(21) Appl. No.: 16/202,328

(22) Filed: Nov. 28, 2018

(65) Prior Publication Data

US 2019/0178677 A1    Jun. 13, 2019

Related U.S. Application Data

(63) Continuation-in-part of application No. 15/840,336, filed on Dec. 13, 2017, now abandoned.

(30) Foreign Application Priority Data

Dec. 12, 2017   (KR) .................. 10-2017-0170679
Nov. 26, 2018   (KR) .................. 10-2018-0147019

(51) Int. Cl.
| | | |
|---|---|---|
| G01C 21/36 | (2006.01) |
| G06F 16/29 | (2019.01) |
| A61G 5/10 | (2006.01) |
| G06F 16/951 | (2019.01) |
| G01C 21/34 | (2006.01) |
| G06F 16/23 | (2019.01) |

(52) U.S. Cl.
CPC ........... *G01C 21/3682* (2013.01); *A61G 5/10* (2013.01); *G01C 21/3461* (2013.01); *G01C 21/3652* (2013.01); *G06F 16/23* (2019.01); *G06F 16/29* (2019.01); *G06F 16/951* (2019.01); *A61G 2203/22* (2013.01)

(58) Field of Classification Search
USPC .......................................................... 701/426
See application file for complete search history.

(56) References Cited

U.S. PATENT DOCUMENTS

| | | | | |
|---|---|---|---|---|
| 2006/0146719 A1* | 7/2006 | Sobek | ..................... | G01C 21/20 370/238 |
| 2008/0300777 A1* | 12/2008 | Fehr | ....................... | G01C 21/20 701/532 |
| 2013/0205257 A1* | 8/2013 | Albright | .............. | G01C 21/206 715/810 |
| 2016/0162992 A1* | 6/2016 | England | ................. | G06Q 40/06 705/36 R |
| 2019/0178677 A1* | 6/2019 | Oh | ......................... | G06F 16/951 |

FOREIGN PATENT DOCUMENTS

JP    2007-139486 A    6/2007

* cited by examiner

*Primary Examiner* — Tyler D Paige
(74) *Attorney, Agent, or Firm* — Stein IP, LLC

(57) ABSTRACT

Provided are a system and a method for providing navigation service for disabled people. The present invention crawls information necessary for free movement for a wheelchair on a road or a sidewalk, generates a database in which relevant road information is reflected, and provides navigation service based on the generated database, thereby enabling a disabled person to safely move to a destination.

6 Claims, 4 Drawing Sheets

SYSTEM AND METHOD FOR PROVIDING NAVIGATION SERVICE OF DISABLED PERSON BASED ON IMAGE ANALYSIS

CROSS-REFERENCE TO RELATED APPLICATIONS

This application is a continuation-in-part of U.S. application Ser. No. 15/840,336, filed Dec. 13, 2017, which claims the benefit of priority of Korean Application No. 10-2017-0170679, filed Dec. 12, 2017, and Korean Application No. 10-2018-0147019, filed Nov. 26, 2018, in the Korean Intellectual Property Office. All disclosures of the documents named above are incorporated herein by reference.

BACKGROUND OF THE INVENTION

Field of the Invention

The present invention relates to a system and a method for providing navigation service for disabled people, and more particularly to a system and a method for crawling information necessary for free movement of a wheelchair on a road, generating a database in which corresponding road information is reflected, and providing navigation service based on the generated database.

Related Art

Recently, there are increasing demands for geographical information systems which provides information about a path to a desired destination or which helps a user to search for a facility, such as a navigation system, a Global Positioning System (GPS) system. Thus, more sophisticated relevant technologies have been developed to improve a user's convenience.

There are also increasing demands for technologies which provides geographical information for elder or disabled people, but such technologies have long way to go.

To enable disabled people, such as wheelchair users, to access and utilize location-based geographical information, there has been proposed a navigation system for wheelchair, as disclosed in Japanese Patent Application Publication No. 2007-139486.

Discovering a curb or a steep slope and finding a safe path is the biggest challenge for wheelchair users to move.

The wheelchair users needs to avoid a curb, a steep uphill or downhill, an uneven ground surface, and an area or building only having stairs rather than a ramp.

SUMMARY OF THE INVENTION

To solve the above problem, the present invention provides a system and a method for providing navigation service for disabled people, the system and method which crawl information necessary for free movement of a wheelchair on a road, generate database in which corresponding road information is reflected, and provide a navigation service based on the generated database.

In one general aspect, there is provided a system for providing navigation service for disabled people, the system comprising: a navigation device (100) configured to receive navigation map information, comprising information about a path to an arbitrary destination and disabled facility Point Of Interest (POI) information, from a service server (200), display the received navigation map information, and transmit movement information based on a Global Positioning System (GPS) signal to the service server (200); the service server (200) configured to transmit navigation map information, comprising found information about a path to the arbitrary destination and disabled facility POI information provided by the POI management server (300), to the navigation device (100), and transmit the movement information, received from the navigation device (100), to a POI management server (300); the POI management server (300) configured to generate disabled facility POI map information, which matches road information, by analyzing collected disabled facility POI information, provide the generated disabled facility POI map information to the service server (200), manage the navigation map information so that error information which is found during analysis of movement information of the navigation device (100) transmitted from the service server (200) is reflected in the navigation map information; and a crawling unit (400) configured to input disabled facility POI information, collected online and offline, to the POI management server (300).

The disabled facility POI information may include at least one of the following: information about a braille block on a road, information about a height of a curb, information about a building ramp, information about a toilet, and information about an elevator.

The crawling unit (400) may include: an online information collector (410) configured to analyze road view images provided from an arbitrary portal server connected over a network, extract location information of a braille block on a road and height information of a curb, and provide the location information and the height information to the POI management server 300; and an offline information collector (420) configured to extract information about a building ramp, information about a toilet, and information about an elevator, and provide the extracted information to the POI management server (300).

The online information collector (410) may identify an image including a braille block from the road view images provided from arbitrary portal server using an identification model.

The road view images provided from arbitrary portal server may be configured by a reference number of images per reference signal, and the online information collector (410) determines latitude and longitude information of a current image based on latitude and longitude information and an order of the current image among the reference number of images provided from the arbitrary portal server.

The service server (200) may generate the information about a path based on the disabled facility POI information.

In another general aspect, there is provided a method of providing navigation service for disabled people, the method comprising: a) generating, by a Point Of Interest (POI) management server (300), a database by collecting disabled facility POI information using a crawling unit (400), and updating the database by reflecting road information in the generated database; b) when an arbitrary navigation device (100) accesses a service server (200) to request provision of navigation map information, generating, by the service server (200), navigation map information and transmitting the generated navigation map information to the navigation device (100), wherein the navigation map information comprises found information about a path to a destination and disabled facility POI information provided by the POI management server 300; and c) when the service server receives the movement information of the navigation device (100), transmitting, by the service server (200), the received movement information of the navigation device (100) to the POI management server (300), and, when error information is found during analysis of the movement information of the navigation device (100), reflecting, by the POI management server (300), the found error information in disabled facility POI map information.

In step a), the crawling unit (400) may be further configured to: access an arbitrary portal server over a network, and extract location information of a braille block on a road and height information of a curb by analyzing road view images provided from the portal server; and extract information about a building ramp, information about a toilet, and information about an elevator by analyzing an image captured at an arbitrary POI.

In step a), the crawling unit (400) may be configured to identify an image including a braille block from the road view images provided from arbitrary portal server using an identification model by a crawling unit (40).

The road view images provided from arbitrary portal server may be configured by a reference number of images per reference signal, and in step a), the crawling unit (400) may be configured to determine latitude and longitude information of a current image based on latitude and longitude information and an order of the current image among the reference number of images provided from the arbitrary portal server by the crawling unit (400).

In step b), the service server (200) may be configured to generate generates the information about a path based on the disabled facility POI information.

DESCRIPTION OF EXEMPLARY EMBODIMENTS

Hereinafter, embodiments of a system and a method for providing navigation service for disabled people according to the present invention will be described with reference to the accompanying drawings.

It will be understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof unless otherwise defined.

In addition, the terms 'part,' 'unit,' and 'module' in the specification may represent a unit for processing at least one function or operation and may be a software component or a hardware component, and or a combination of hardware and software.

Figure 1:
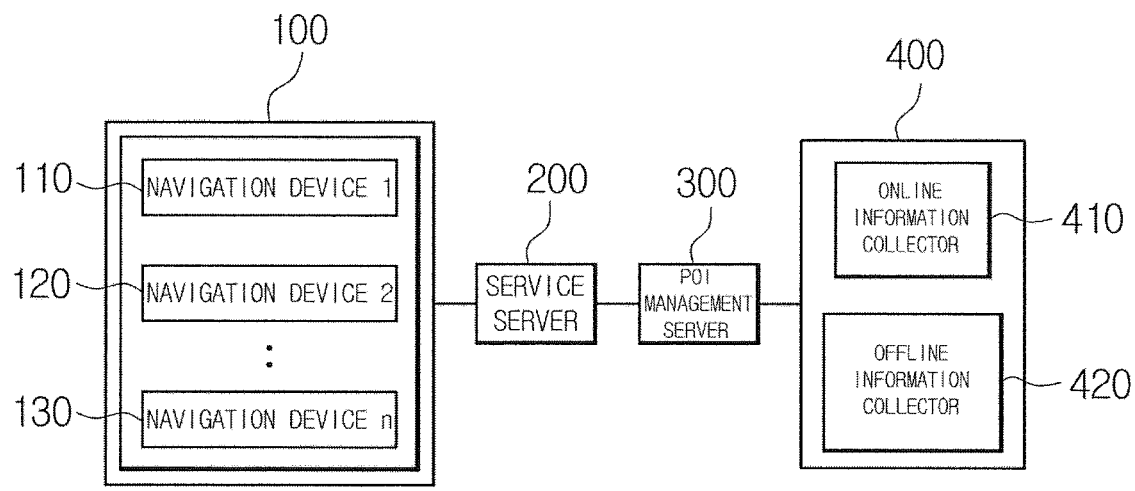
FIG. 1 is a block diagram illustrating a system for providing a navigation service for disabled people according to the present invention.
Figure 2:
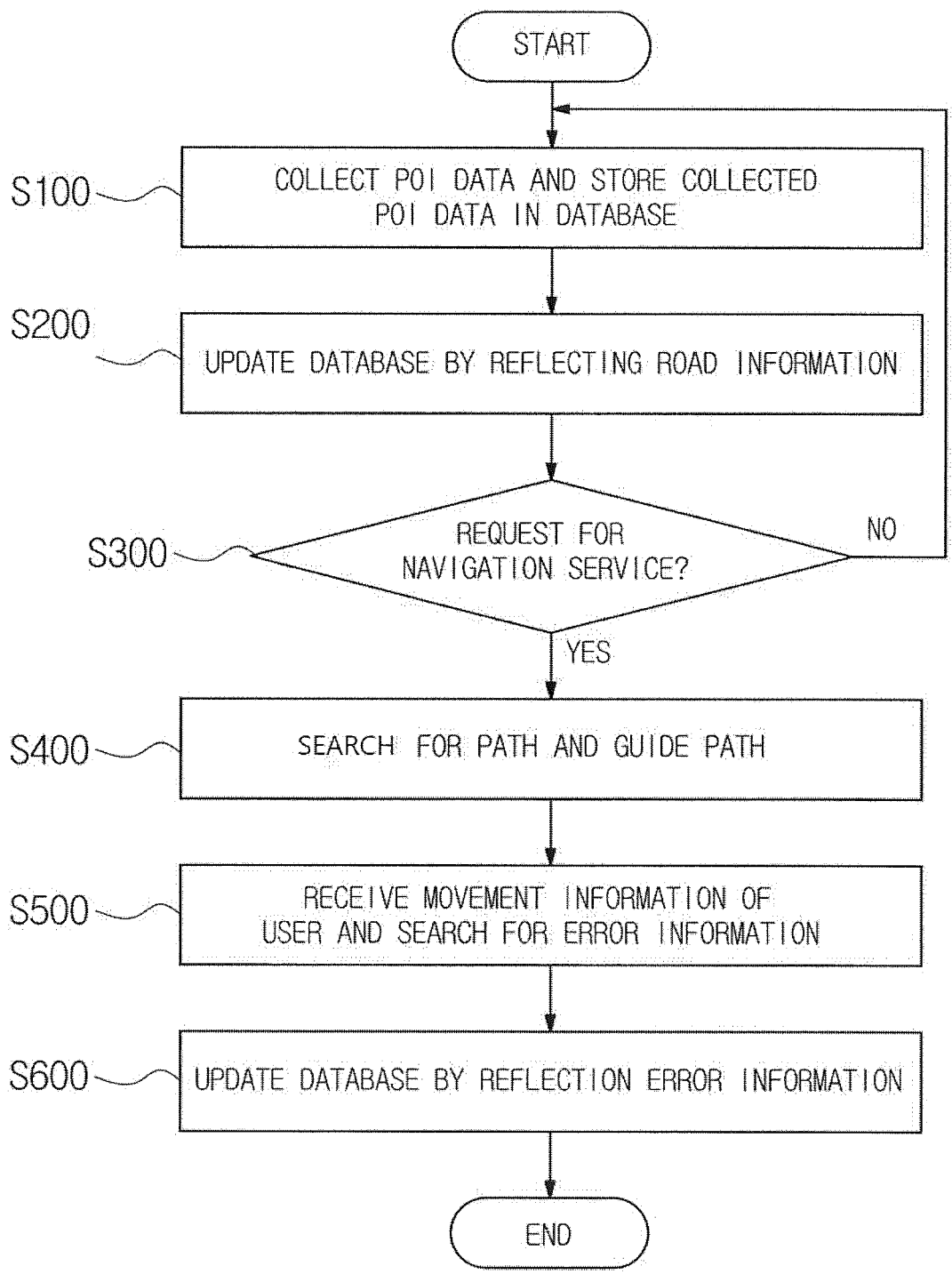
FIG. 2 is a flowchart illustrating a method for providing service using a system for providing navigation service for disabled people according to the present invention.

FIG. 1 is a block diagram illustrating a system for providing navigation service for disabled people according to the present invention; FIG. 2 is a flowchart illustrating a method for providing navigation service using a system for providing navigation service for disabled people according to the present invention; and FIG. 3 is a flowchart illustrating a procedure of collecting a Point of Interest (POI) the method for providing service using a system for providing a navigation service for disabled people, as shown in FIG. 2.

Figure 3:
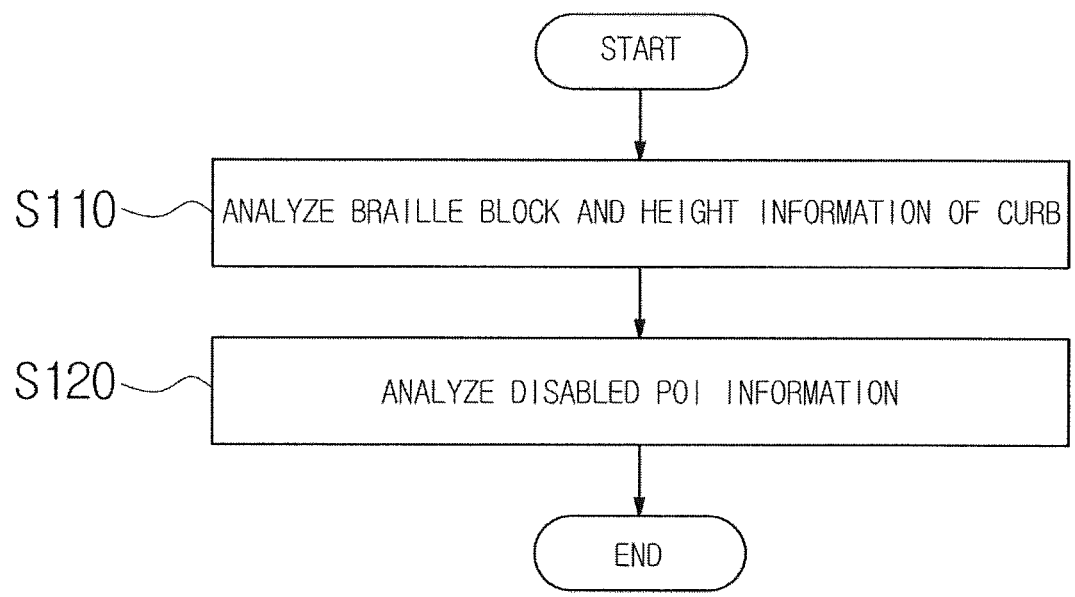
FIG. 3 is a flowchart illustrating a procedure of collecting Point of Interest (POI) data in the method for providing service using a system for providing a navigation service for disabled people, as shown in FIG. 2.

Referring to FIGS. 1 to 3, a system 100 for providing navigation service according to the present invention includes a navigation device 100, a service server 200, a POI management server 300, and a crawling unit 400.

The navigation device 100 may access the service server over a wireless network, and display location information on a map using a Global Positioning System (GPS) signal. In addition, when a user inputs information about an arbitrary destination to transmit the information to the service server 200, the navigation device 100 may receive navigation map information, which includes information about a path to the destination, from the service server 200 and display the received information. The navigation device may be composed of a plurality of devices, such as a navigation device 1 110, a navigation device 2 120, ... and a navigation n 130.

In addition, while moving based on the navigation map information, the navigation device 100 may transmit movement information of the navigation device 100 based on a GPS signal to the service server 200.

That is, the navigation device 100 may detect guidance error between the movement information provided by the navigation device 100 and path guidance information transmitted by the service server 200, path departure, information about location discrepancy of a disabled facility POI, etc. Then, the navigation device 100 may transmit information about the detection.

Upon receiving information about a path to a destination requested by the navigation device 100, the service server 200 may search a map database (not shown) for the information about a path to the destination.

In addition, the service server 200 may receive disabled facility POI information provided by the POI management server 300 connected over a network, generate navigation map information by incorporating the received information with the found information about the path to the destination, and transmit the generated navigation map information to the navigation device 100. According to an embodiment, the service server 200 may generate the information about a path based on the disabled facility POI information received by the POI management server 300. For example, the service server 200 may generate the information about a path to bypass a step or a road having a high projection. Alternatively, the service server 200 may generate the information about a path optimized based on a facility including a disabled toilet and a disabled elevator. Alternatively, the service server 200 may generate the information about a path based on a braille block.

The navigation map information may be displayed on map information provided in an arbitrary format along with a path. In this case, the navigation map information may include information about a sidewalk, information about a crosswalk, location about an elevator for an overpass or an underpass, and location information about a wheelchair lift, so that a wheelchair user is enabled to move.

In addition, the navigation map information may be provided along with a path including areas where curbs are determined low enough for a wheelchair user to pass over based height information of the curbs.

In addition, the navigation map information may be transmitted in the form of two-dimensional (2D) or three-dimensional (3D) information, and include latitude and longitude information.

In addition, the service server 200 may receive movement information transmitted from the navigation device 100, and transmit the received movement information to the POI management server 300.

The POI management server 300 may analyze disabled facility POI information collected by the crawling unit 400, and generate disabled facility POI map information which matches pre-stored road information.

In addition, the POI management server 300 may provide the generated disabled facility POI map information to the service server 200 connected over a network. If error information is found during analysis of movement information transmitted from the service server 200, the POI management server 300 may reflect the found error information in the disabled facility POI map information so as to periodically update the disabled facility POI map information.

That is, the POI management server 300 may detect guidance error between the movement information provided by the navigation device 100 and path information transmitted by the service server 200, path departure, information about location discrepancy of a disabled facility POI, etc. Then, the POI management server 300 may compare the detected information with information items set in disabled facility POI map information, and then modify the disabled facility POI information depending on a result of the comparison.

The crawling unit 400 may distinguish disabled facility POI information by analyzing road view images, which are collected online and offline, together with information about a random image. Then, the crawling unit 400 may input the distinguished disabled facility POI information to the POI management server 300. The crawling unit 400 may include an online information collector 410, and an offline information collector 420.

The online information collector 410 may receive road view images provided from any server connected over a network, and identify an image of a braille block and an image of a curb using a pre-stored image processing program. The online information collector 410 may extract location information of the braille block and height information of the curb from images respectively identified as the braille and the curb, and may provide the location information and the height information to the POI management server 300. The online information collector 410 may be composed of an open Application Programming Interface (Open API), a web crawler, etc.

That is, a braille block is distinguished and extracted based on its standardized shape and unique color (yellow), and a curb is distinguished and extracted based on a road color, a traffic line, the curb's shape, and a step from a road.

According to an embodiment, original road view images provided from an arbitrary portal service may be configured by a predetermined number of images per reference distance. The online information collector 410 may crawl only a part of the original road view images to use for analysis. For example, original road view images may be configured by 60 images per 10 meters. The online information collector 410 may sample and crawl only 20 images of 60 original road view images.

According to an embodiment, the online information collector 410 may identify images including the braille block from the crawled images using an identification model. Learning the identification model may be performed based on machine learning. For example, the learning the identification model may be performed by using many images including the braille block as input. As the identification model according to an embodiment, open source software such as Tensor Flow may be used. However, the present invention is not limited thereto.

Figure 4:
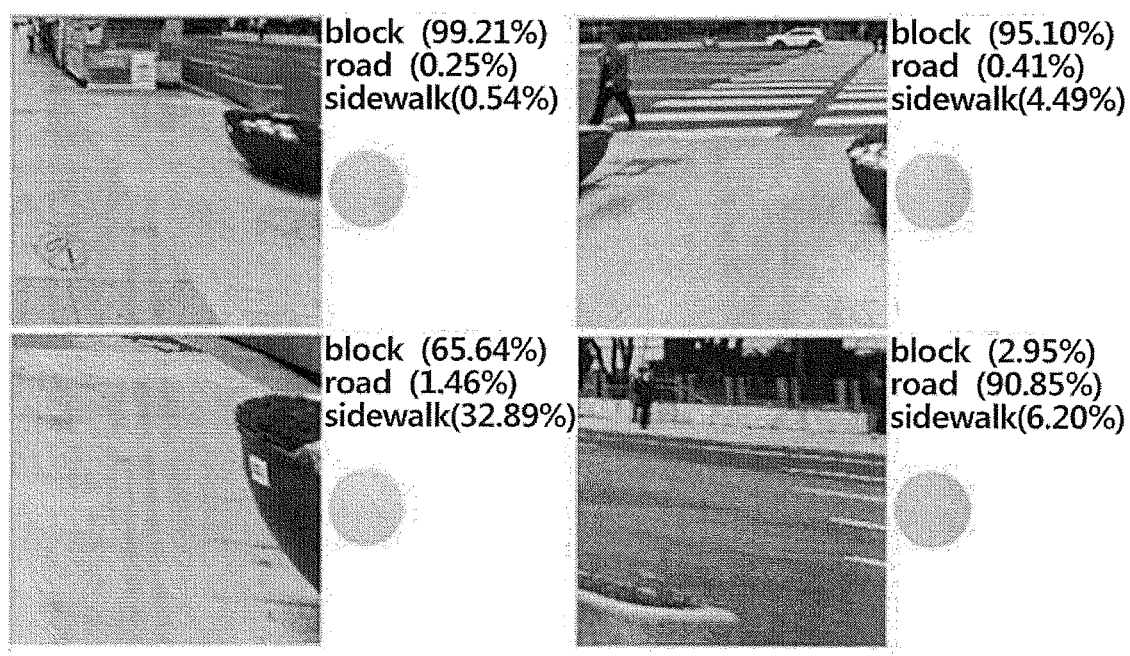
FIG. 4 is an image analysis result according to an embodiment.
Figure 5:
FIG. 5 is a navigation map on which disabled facility POI information is displayed according to an embodiment.

FIG. 4 illustrates a result which identifies a plurality of images as blocks, roads, and sidewalks. For example, the online information collector 410 may identify the crawled road view images as one of the braille block, the road, and the sidewalk to label the identified information. The online information collector 410 may determine a probability of a current road view image being a braille block image, a probability of a current road view image being a road image, a probability of a current road view image being a sidewalk image, and may determine a road view image having a probability of a braille block image greater than a threshold value as a braille block image.

Referring back to FIG. 1 to FIG. 3, the online information collector 410 may additionally perform an image identification operation such as a height difference of a projection with respect to crawled images, identification with respect to a runway, and identification with respect to a step using an identification model. Although the additional image identification operation may be performed for images identified as images having a braille block, the present invention is not limited thereto.

According to an embodiment, the online information collector 410 may compensate latitude and longitude information on original road view images provided from a portal server in order to determine each latitude and longitude information of crawled images. The online information collector 410 may determine latitude and longitude information of a current image based on latitude and longitude information and an order of the current image among the reference number of images provided from the arbitrary portal server. For example, when the original road view images are configured by a predetermined number of images per reference distance and it is assumed that images allocated in each reference distance is one frame, the online information collector 410 may provide latitude and longitude information on an arbitrary image in a frame by compensating the latitude and longitude information provided in a unit of one frame.

For example, when the number of images crawled in a unit of each frame is 20, the online information collector 410 may compensate latitude and longitude information of a first image (that is, a first image among 20 images) included an n-th frame based on 1/20 of a difference of second latitude and longitude information from first latitude and longitude information on the basis of latitude and first longitude information of the n-th frame and second latitude and longitude information on an (n+1)-th frame.

The online information collector 410 may transmit extracted disabled facility POI information to a POI management server 300 together with POI information of a peripheral building.

The offline information collector 420 transmits image information shot from a shooting means such as a camera (e.g., 360° action cam) and current location information using a GPS signal to the POI management server 300 using a wireless network. The offline information collector 420 extracts disabled facility POI information from shot images such as a building ramp, a toilet entrance, and an elevator, from an image captured at an arbitrary POI, such as a specific building, a pedestrian overpass, an underpass, a public toilet, and a subway station to provide the extracted disabled facility POI information to the POI management server 300 together with location information of the extracted disabled facility POI information.

According to an embodiment, the offline information collector 420 may be used to generate disabled facility POI information on a place where a portal server does not provide a road view. For example, since a narrow sidewalk in which vehicles cannot be run but only persons may walk does not provide a road view, the offline information collector 420 may transmit an image acquired from a camera and/or disabled facility POI information directly acquired by a person to a cloud server (or POI management server 300). According to an embodiment, the disabled facility POI transmitted to the cloud server from the offline information collector 420 may be also provided to the portal server, and the portal server may ensure wide and exact POI data based thereon.

The disabled facility POI information includes a braille block on a road, a height of a boundary stone, a runway entrance of a building, a toilet, and elevator information. However, the present invention is not limited thereto, and various disable facilities may be used as POI information.

According to an embodiment, image information or disabled facility POI information collected from the offline information collector 420 may be provided to the POI management server 500 in connection with an image crawled from the offline information collector 410. For example, the image collected from the offline information collector 420 is combined with the original road view image to be transmitted to the POI management server 300.

Following is description about a method of providing service by a system for providing navigation service for disabled people according to the present invention.

The POI management server 300 stores POI information of disabled facilities, which is collected by the crawling unit 400, in a database in S100.

In Step S100, the crawling unit 400 collects road view images provided from an arbitrary portal server connected over a network using the online information collector 410 composed of an open API, web crawler, etc.; identifies a braille block and a curb on a road using the pre-stored image processing program; extracts location information of the braille block and height information of the curb from images respectively identified as the braille block and the curb; and store the extracted POI information and location information of disabled facilities in the database in S110.

In addition, in Step S100, the crawling unit 400 extracts POI information of disabled facilities, such as a building ramp, a toilet entrance, and an elevator, from an image captured at an arbitrary POI, such as a specific building, a pedestrian overpass, an underpass, a public toilet, and a subway station, using the offline information collector 420; and stores the extracted location information about the POI information of disabled facilities in the database in S120.

Further, in step S100, the crawling unit 400 may identify an image including a braille block from the road view images provided from the arbitrary portal server using an identification model. Leaning the identification model may be performed based on machine learning. For example, the learning the identification model may be performed by using many images including a braille block as an input. As the identification model according to an embodiment, although open source software such as tensor flow may be used, the present invention is not limited thereto.

Moreover, in step S100, the crawling unit 400 may compensate latitude and longitude information on the original road view images provided from a portal service in order to determine latitude and longitude information on the crawled images. The crawling unit 400 may determine latitude and longitude information of a current image based on latitude and longitude information and an order of the current image among a reference number of images provided from the arbitrary portable server. For example, when the original road view images are configured by a predetermined number of images per reference distance and it is assumed that images allocated in each reference distance is one frame, the online information collector 410 may provide latitude and longitude information on an arbitrary image in a frame by compensating the latitude and longitude information provided in a unit of one frame.

For example, when the number of images crawled in a unit of each frame is 20, the crawling unit 400 may compensate latitude and longitude information of a first image (that is, a first image among 20 images) included an n-th frame based on 1/20 of a difference of second latitude and longitude information from first latitude and longitude information on the basis of latitude and first longitude information of the n-th frame and second latitude and longitude information on an (n+1)-th frame.

After Step S100, the POI management server 300 may update information by reflecting the POI information of disabled facilities and road information in a stored database, and generate POI map information of disabled facilities using the updated information in S200.

The POI map information of disabled facilities generated in Step S200 is provided to the service server 200, and the service server 200 detects a request for navigation service in S300.

If an arbitrary navigation device 100 accesses the service server 200 to request provision of navigation map information in Step S300, the service server 200 may search pre-stored map information for information about a path to a destination input to the navigation device 100, generate navigation map information including the found information of the path and POI map information of disabled facilities provided by the POI management server 300, and transmit the generated navigation map information to the navigation device 100 in S400.

According to an embodiment, the service server 200 may generate the information about a path based on the disabled facility POI information received by the POI management server 300. For example, the service server 200 may generate the information about a path to bypass a step or a road having a high projection. Alternatively, the service server 200 may generate the information about a path optimized based on a facility including a disabled toilet and a disabled elevator. Alternatively, the service server 200 may generate the information about a path based on a braille block.

After Step S400, the service server 200 may movement information of the navigation device 100 while providing navigation service, and may transmit the received movement information of the navigation device 100 to the POI management server 300. The POI management server 300 analyzes the movement information of the navigation device 100 in S500.

If various types of error information, such as a guidance error, path departure, and location discrepancy of a disabled facility POI, are found from the movement information of the navigation device 100, the POI management server 300 may analyze the found error information and reflect a result of the analysis in disabled facility POI map information.

Therefore, by crawling information necessary for free movement of a wheelchair on a road or a sidewalk and providing navigation service in which corresponding road information is reflected, it is possible to enable a disabled person to safely move or reach a specific destination.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The reference numbers in the claims of the present invention are provided for the sake of clarity and convenience in explanation. It should be noted that the drawings are not to precise scale and may be exaggerated in thickness of lines or size of components for descriptive convenience and clarity. Furthermore, the terms used herein are defined by taking functions of the present invention into account and can be changed according to the custom or intention of users or operators. Therefore, definition of the terms should be made according to the overall disclosures set forth herein.

The present invention may crawl information necessary for free movement of a wheelchair on a road or a sidewalk, generate a database in which corresponding road information is reflected, and provide navigation service based on the generated database, so that a disabled person is enabled to move safely.

Although embodiments of the present invention have been described with reference to a number of illustrative embodiments thereof, it should be understood that numerous other modifications and embodiments can be devised by those skilled in the art that will fall within the spirit and scope of the principles of this disclosure.

Reference numerals described in claims of the present invention is illustrative purposed only for greater clarity and convenience, in the drawings, the thicknesses of lines or the size of constituent elements are exaggerated for greater clarity and convenience. The terminologies used in this specification should be defined based on the substantial meanings thereof and the whole context throughout the present specification.

What is claimed is:

1. A system for providing navigation service for disabled people, the system comprising:
a navigation device (100) configured to receive navigation map information, comprising information about a path to an arbitrary destination and disabled facility Point Of Interest (POI) information, from a service server (200), display the received navigation map information, and transmit movement information based on a Global Positioning System (GPS) signal to the service server (200);
the service server (200) configured to transmit navigation map information, comprising found information about a path to the arbitrary destination and disabled facility POI information provided by the POI management server (300), to the navigation device (100), and transmit the movement information, received from the navigation device (100), to a POI management server (300);
the POI management server (300) configured to generate disabled facility POI map information, which matches road information, by analyzing collected disabled facility POI information, provide the generated disabled facility POI map information to the service server (200), manage the navigation map information so that error information which is found during analysis of movement information of the navigation device (100) transmitted from the service server (200) is reflected in the navigation map information; and
a crawling unit (400) configured to input disabled facility POI information, collected online and offline, to the POI management server (300),
wherein the disabled facility POI information comprises at least one of the following:
information about a braille block on a road, information about a height of a curb, information about a building ramp, information about a toilet, and information about an elevator,
wherein the crawling unit (400) comprises:
an online information collector (410) configured to analyze road view images provided from an arbitrary portal server connected over a network, extract location information of a braille block on a road and height information of a curb, and provide the location information and the height information to the POI management server 300; and
an offline information collector (420) configured to extract information about a building ramp, information about a toilet, and information about an elevator, and provide the extracted information to the POI management server (300),
wherein the online information collector (410) identifies an image including a braille block from the road view images provided from arbitrary portal server using an identification model.

2. The system of claim 1, wherein the road view images provided from arbitrary portal server are configured by a reference number of images per reference signal, and
the online information collector (410) determines latitude and longitude information of a current image based on latitude and longitude information and an order of the current image among the reference number of images provided from the arbitrary portal server.

3. The system of claim 1, wherein the service server (200) generates the information about a path based on the disabled facility POI information.

4. A method of providing navigation service for disabled people, the method comprising:
a) generating, by a Point Of Interest (POI) management server (300), a database by collecting disabled facility POI information using a crawling unit (400), and updating the database by reflecting road information in the generated database;
b) when an arbitrary navigation device (100) accesses a service server (200) to request provision of navigation map information, generating, by the service server (200), navigation map information and transmitting the generated navigation map information to the navigation device (100), wherein the navigation map information comprises found information about a path to a destination and disabled facility POI information provided by the POI management server 300; and
c) when the service server receives the movement information of the navigation device (100), transmitting, by the service server (200), the received movement information of the navigation device (100) to the POI management server (300), and, when error information is found during analysis of the movement information of the navigation device (100), reflecting, by the POI management server (300), the found error information in disabled facility POI map information,
wherein, in step a), the crawling unit (400) is further configured to:
access an arbitrary portal server over a network, and extract location information of a braille block on a road and height information of a curb by analyzing road view images provided from the portal server; and extract information about a building ramp, information about a toilet, and information about an elevator by analyzing an image captured at an arbitrary POI, wherein, in step a), the crawling unit (400) is configured to identify an image including a braille block from the road view images provided from arbitrary portal server using an identification model by a crawling unit (40).

5. The method of claim 4, wherein the road view images provided from arbitrary portal server are configured by a reference number of images per reference signal, and in step a), the crawling unit (400) is configured to determine latitude and longitude information of a current image based on latitude and longitude information and an order of the current image among the reference number of images provided from the arbitrary portal server by the crawling unit (400).

6. The method of claim 4, wherein in step b), the service server (200) is configured to generate generates the information about a path based on the disabled facility POI information.

* * * * *